United States Patent [19]

Messenger

[11] Patent Number: 5,058,143
[45] Date of Patent: Oct. 15, 1991

[54] DIGITAL COMMUNICATIONS SYSTEMS

[75] Inventor: Alan Messenger, Cumbria, England

[73] Assignee: British Aerospace Public Limited Company, London, England

[21] Appl. No.: 416,789

[22] Filed: Oct. 5, 1989

[30] Foreign Application Priority Data

Oct. 5, 1988 [GB] United Kingdom ............... 8823336

[51] Int. Cl.[5] .............................................. H04L 7/02
[52] U.S. Cl. ........................................ 375/118; 328/55
[58] Field of Search .......................... 369/60; 370/108; 375/118, 119; 328/55; 331/76; 371/21.1, 21.2, 21.3, 21.4; 377/47

[56] References Cited

U.S. PATENT DOCUMENTS

| | | | |
|---|---|---|---|
| 4,596,026 | 6/1986 | Cease et al. | 370/108 |
| 4,646,291 | 2/1987 | Perntz et al. | 370/108 |
| 4,670,878 | 6/1987 | Childers | 371/21.1 |
| 4,716,575 | 12/1987 | Douros et al. | 370/108 |
| 4,757,503 | 7/1988 | Hayes et al. | 371/21.1 |
| 4,811,367 | 5/1989 | Tajika | 370/108 |
| 4,827,476 | 5/1989 | Garcia | 371/21.1 |
| 4,841,548 | 6/1989 | Voljnik | 375/119 |
| 4,849,973 | 7/1989 | Kubota | 371/21.1 |
| 4,876,699 | 10/1989 | Nelson | 375/119 |
| 4,935,701 | 6/1990 | Kawai et al. | 328/55 |

Primary Examiner—Benedict V. Safourek
Assistant Examiner—Young Tse
Attorney, Agent, or Firm—Cushman, Darby & Cushman

[57] ABSTRACT

An asynchronous communications device includes a dual port memory, means for inputting data into the dual port memory, and means for outputting data from the dual port memory, the device being configured to operate in a receive mode or a transmit mode according to its connection in a communications system. Suitably the device includes a built-in test facility for both the transmit mode and the receive mode. Preferably a clock frequency of 80 MHz is used for the operation of the device, and a 40 MHz clock signal is used to derive the 80 MHz clock frequency, the 80 MHz frequency being formed by four 20 MHz clock frequencies arranged with their rising edges 90° out of phase. There is also provided a method of producing a clock frequency by utilizing four clock pulses with their rising edges 90° apart.

2 Claims, 9 Drawing Sheets

DIGITAL COMMUNICATIONS SYSTEMS

FIELD OF THE INVENTION

This invention relates to digital communications systems and is more particularly concerned with a communications device for use in such a system.

BACKGROUND OF THE INVENTION

Digital communications systems are useful in a variety of complex control systems, for example, automatic control systems for controlling military aircraft which require 'fly-by-wire' systems in order to enable them to be flown. The need, in this and other areas of application, to handle large quantities of data, in real time, and with great reliability, has fuelled the development of such systems.

Early digital computing systems operated on the basis of software programs stored in memory devices. This approach meant that they were easy to program; and digital system development continued to follow the accepted "school of thought", that of using a 'Von Neumann Architecture' based on a Central Processing Unit (CPU), which executed the whole software task sequentially. It became apparent however that, with high data throughput requirements, a 'bottleneck' was being thereby created due to the CPU's inability to execute more than one instruction at a time. This restricted the digital computer's ability to cope with increasingly complex tasks designed to be executed within a given time constraint, so restricting its ability to achieve desired system control performance.

Until recently microprocessors were slow and the complexity of the control task meant that complex software executives had to be incorporated within each program in order that acceptable data throughput times could be achieved to obtain the system performances required. These software executive structures were complex and time consuming to produce.

Synchronisation of data throughput between control lines included assigning cross consolidation techniques prior to each control task being executed. Synchronisation allowed exchange of parameters between lines at exactly the time they were required. This removed the problem of time skew occurring and so eased the task of cross consolidation. However, the voter monitor software, designed to increase reliability by taking the votes of a plurality of outputs before executing action based on those outputs, and which must therefore be executed before the control law algorithm, resulted in a significant hardware overhead if the overall iteration rate was to be adequately fast.

Thus, apart from the considerable task of producing an executive structure, which keeps all processors across four lines of a control system synchronised, there was also a significant hardware overhead. Synchronous systems required the use of special hardware modules which were used to execute specific functions. Although each module was able to perform its function efficiently, when dissimilar designs of modules were integrated together in a single unit, the task of software and hardware debugging became much more complex. Whilst the hardware proliferation made the overall computer system more capable, it also resulted in higher design, development and manufacturing costs.

The synchronisation of microprocessors also leads to an increased probability of common mode failure between lines. The complexity of both the hardware and software design leads to an increased probability of a degradation in synchronisation between processors due to a single software bug or hardware failure.

In summary, a synchronous serial (single processor) system has the advantage of eliminating time skew problems but has the disadvantages of slow data throughput, complex software executives, increased probability of common mode failure and increased hardware overheads.

An alternative concept of an Asynchronous Multi Processor System (AMPS) has been developed which is intended to provide a cost effective solution, particularly in the design of active flight control computers for aircraft and which overcomes many of the difficulties described above. Such a concept is disclosed in published European Patent Application 0200352.

The AMPS concept relies on a number of identical processing modules, running in parallel with one another but asynchronously. The asynchronous processing enables any processor to perform its control task at the maximum possible rate. The latest (i.e. the most recent data) will be stored as a variable which can be accessed at any time by another asynchronous processor. There are thus no processor 'wait' states associated with the transfer of data between modules. Data throughput is accordingly increased to a rate much higher than the minimum acceptable level for future unstable aircraft.

The principal of asynchronous processors working in parallel also eliminates the need for complex executive functions. Processing modules iterate their own control task at the maximum rate, sampling and outputting data in a totally autonomous way. The need for an executive to schedule the order in which the control tasks are implemented, in order to achieve high throughput times, is eliminated. The advantage of this is twofold:

a) In synchronous systems the executive required to implement control software is becoming highly complex. This not only incurs high software overheads, it also increases the processing cycle time for each computing module. To reduce this total cycle time, the executive software becomes more complex and the software unit costs then far outweigh those of hardware. By comparison the executive overhead in a computer system based on the AMPS concept will be very much reduced.

b) As the executive software becomes more complex, the integrity of the control system is reduced. The AMPS architecture will consequently possess a higher integrity software, as well as a high integrity hardware structure.

Time skew occurs in asynchronous systems because the input signal sampling occurs at different instants in time for each processor. Present day microprocessors are fast enough to sample and process data in a short iteration time, such that time skew is minimal and therefore degradation of the control output is no longer acute.

In an AMPS network, computing modules are standardised to ease fault hardware inspection as well as reduce design, development and manufacturing costs.

This modularity of the AMPS architecture will enable future Very Large Scale Integration (VLSI) microprocessors to be readily incorporated into the system. For enhanced performance, a thirty-two bit microprocessor can be adopted, but a choice exists between the latest commercially available devices and a custom design. The option selected will depend on the future control law, voter monitor task and the iteration rates that must be achieved.

The key part of the AMPS architecture is a modular computer card or General Computing Module (GCM) which contains serial communications devices to which VLSI techniques can be applied.

SUMMARY OF THE INVENTION

Accordingly to one aspect of the invention, there is provided an asynchronous communications device including a dual port memory, means for inputting data into the dual port memory, and means for outputting data from the dual port memory, the device being configured to operate in a receive mode or a transmit mode according to its connection in a communication system.

Advantageously, the device can also function as a data concentrator to access a number of external Dual Port Memories (DPMs) and retransmit the data.

When operating in the receiving mode, any digital clock extraction circuit implemented needs to operate at a minimum rate four times that of the data signal frequency. However, if a data signal frequency of 20 MHz is used, it is difficult to implement effectively a clock frequency of 80 MHz.

According to a further aspect of the invention, there is provided a method of producing a clock frequency by utilising four clock pulses with their rising edges 90° apart.

Such a method of implementing the clock frequency overcomes the disadvantage caused by the receiver and transmitter clock frequencies drifting apart during the course of a message in a phase locked loop whilst locking onto the synch. pulse. Furthermore it overcomes the problem associated with clock extraction directly from data i.e. the clocks only being present when the data is present.

BRIEF DESCRIPTION OF THE DRAWINGS

For a better understanding of the invention, reference will now be made, by way of example only, to the accompanying drawings in which.

DESCRIPTION OF THE PREFERRED EMBODIMENTS

Figure 1:
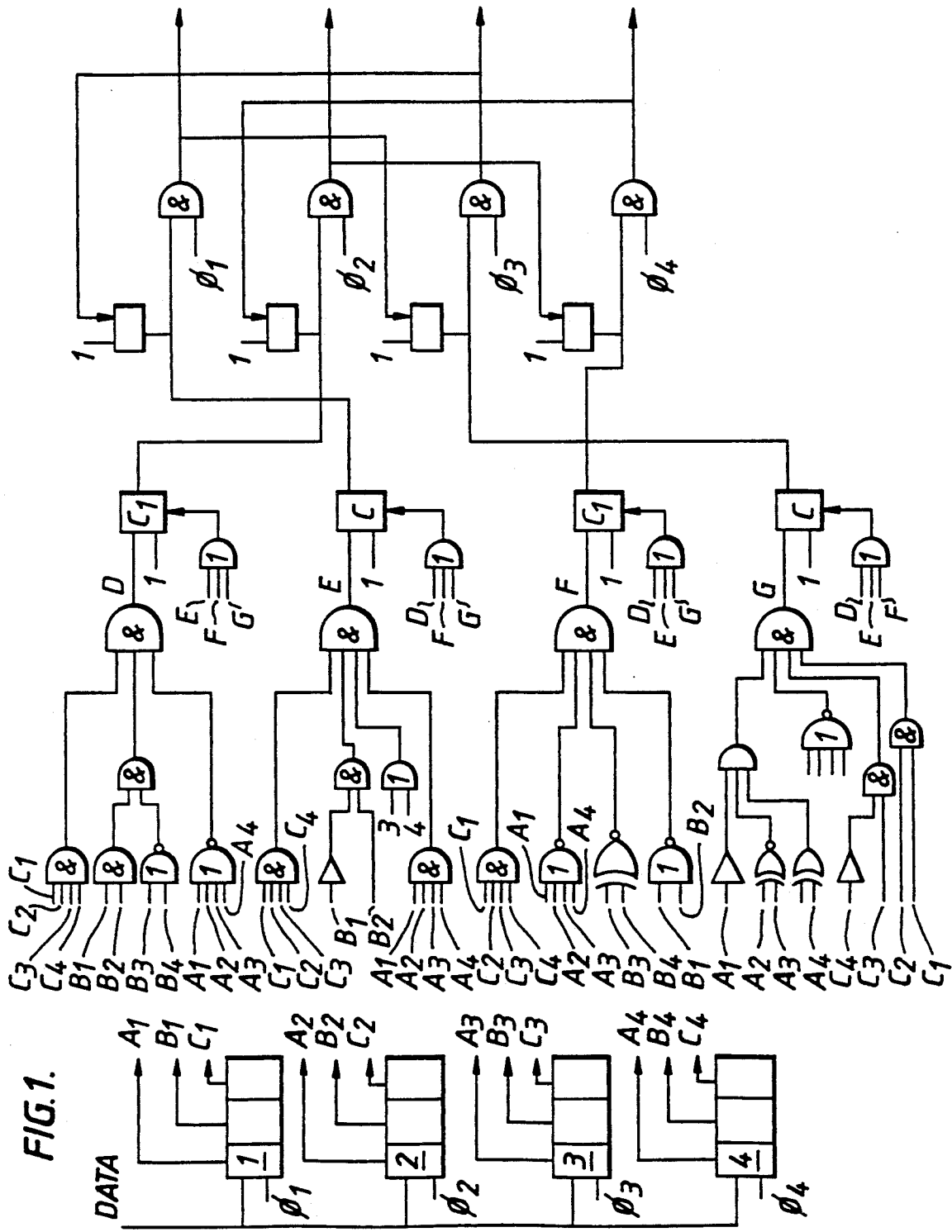
FIG. 1 shows an arrangement using four 20 MHz clocks to provide a frequency of 80 MHz.

As it is proposed to use four 20 MHz clocks with their rising edges 90° apart, the rising edges taken together will occur at a frequency of 80 MHz. These four 20 MHz clocks are derived from a 40 MHz generator using appropriate circuitry and may be used to clock Manchester coded data (10=1; 01=0) into four three-bit serial to parallel shift registers 1, 2, 3, 4 as shown in FIG. 1. The data within these four shift registers is changing at 80 MHz, therefore effectively sampling the incoming data at that rate. The clock extraction circuit will therefore need to latch onto one of the patterns produced in the set of shift registers, and from that pattern, align the system clock with the data.

The synch. pulse chosen for the AMPS protocol is three bits wide, that is one and a half bits high, followed by one and a half bits low. The reason for using such a pulse is twofold:

a) Reproduction of the synch pattern in the middle of a word is impossible, even if a 'glitch' or error occurs in the data.

b) The receiver design used requires that once a particular synch. pattern has been recognised, the first data bit of the preceding word must not occur before that particular pattern has switched in its associated clocks. Hence the lengthened three bit synch pulse.

Figure 2:
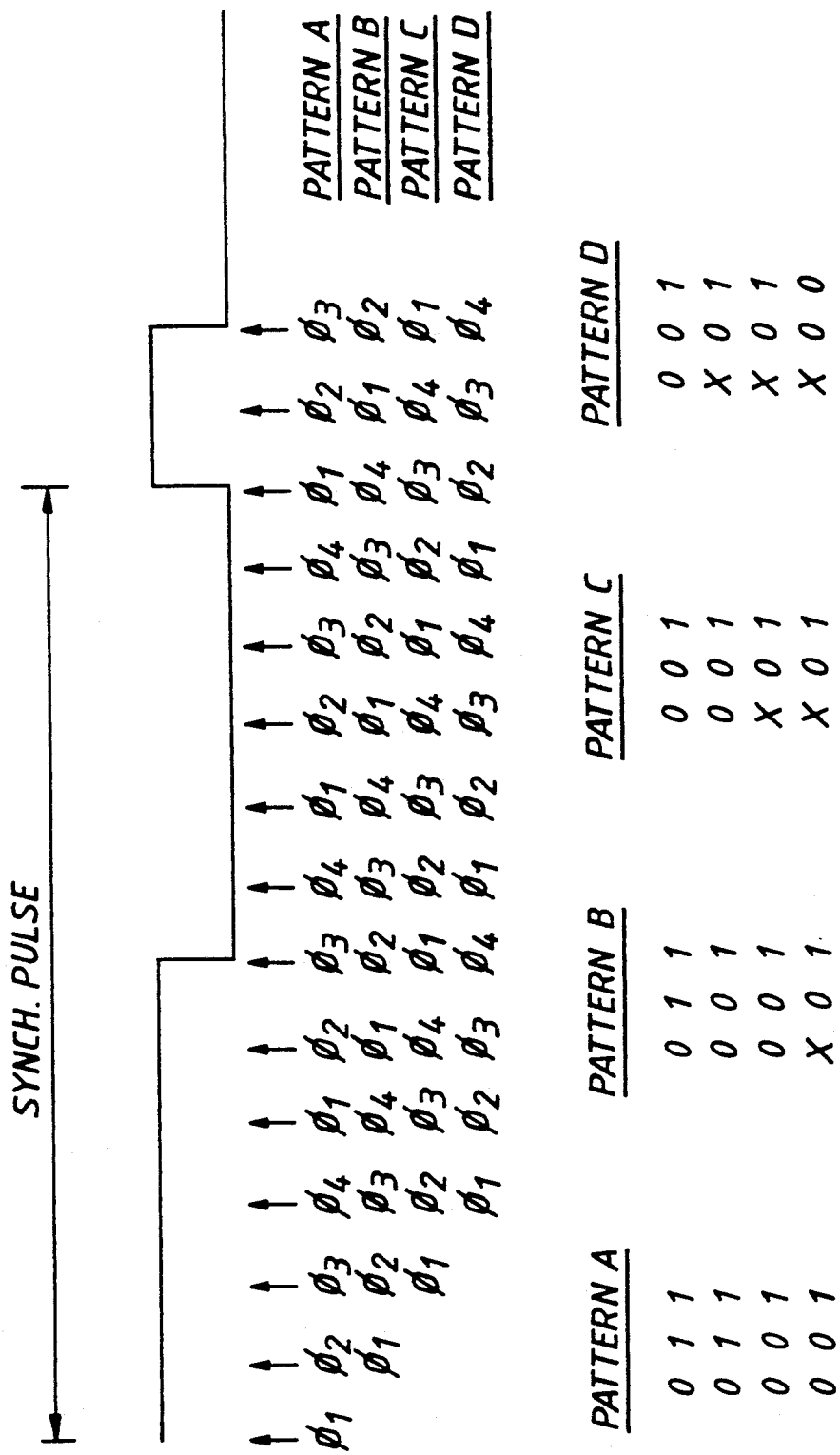
FIG. 2 shows four synch. patterns possible.

By referring initially to FIG. 2, there are four possible synch. patterns which may be latched into the shift registers by the four 20 MHz clocks. Patterns B, C and D contain 'don't care' states because these occur past the end of the synch. pulse, which is detected simply by the presence of six 'ones' or 'zeros'.

Associated with each pattern are two particular system clocks, which are aligned with both half bits of the data word i.e. pattern A has clock $\phi_2$ aligned with the first half bit and clock $\phi_4$ with the second half bit. Pattern B has clock $\phi_1$ and $\phi_3$ etc. By recognition of these four patterns, their associated clocks can be latched through, and used in the main receiver circuitry of the chip. On every synch. pulse it is the sixth low 20 MHz clock pulse of any one particular pattern which is detected. The four pattern detectors are a set of simple combinational logic gates as shown in FIG. 1. Once a set synch. pulse is detected then the output of one of the sets of combinational logic gates goes high for 12.5 ns. It is this short pulse which is used to latch the clock associated with that pattern through to the next stage of the receiver.

If pattern A is detected, then the associated D-type flip-flop will have its high input latched, so enabling the output 'AND' gate, and through-putting clock $\phi_2$ (FIG. 1). Clock $\phi_4$ is enabled via a second D-type flip-flop on the rising edge of $\phi_2$. This ensures that the first rising edge of $\phi_2$ occurs before that of $\phi_4$, so clocking information into the receiver in the correct order. Both $\phi_2$ and $\phi_4$ are enabled for a total of twenty-nine bits (to the twelfth 80 MHz clock pulse on the preceding synch.) where crossover between clock signals will occur if the data needs to be resynched; for instance, if 'glitching' or time skew has occurred, and the shift registers clock in a different synch pattern, then $\phi_2$ and $\phi_4$ must be disabled before latching through the two new clocks. This is achieved by applying a 'clear' signal to all D-type flip-flops via a three-input OR gate as shown in FIG. 1. Careful design of the pattern detectors is required in order to equalise critical path lengths, as timing considerations are critical through the various logic gates and latches.

Figure 3:
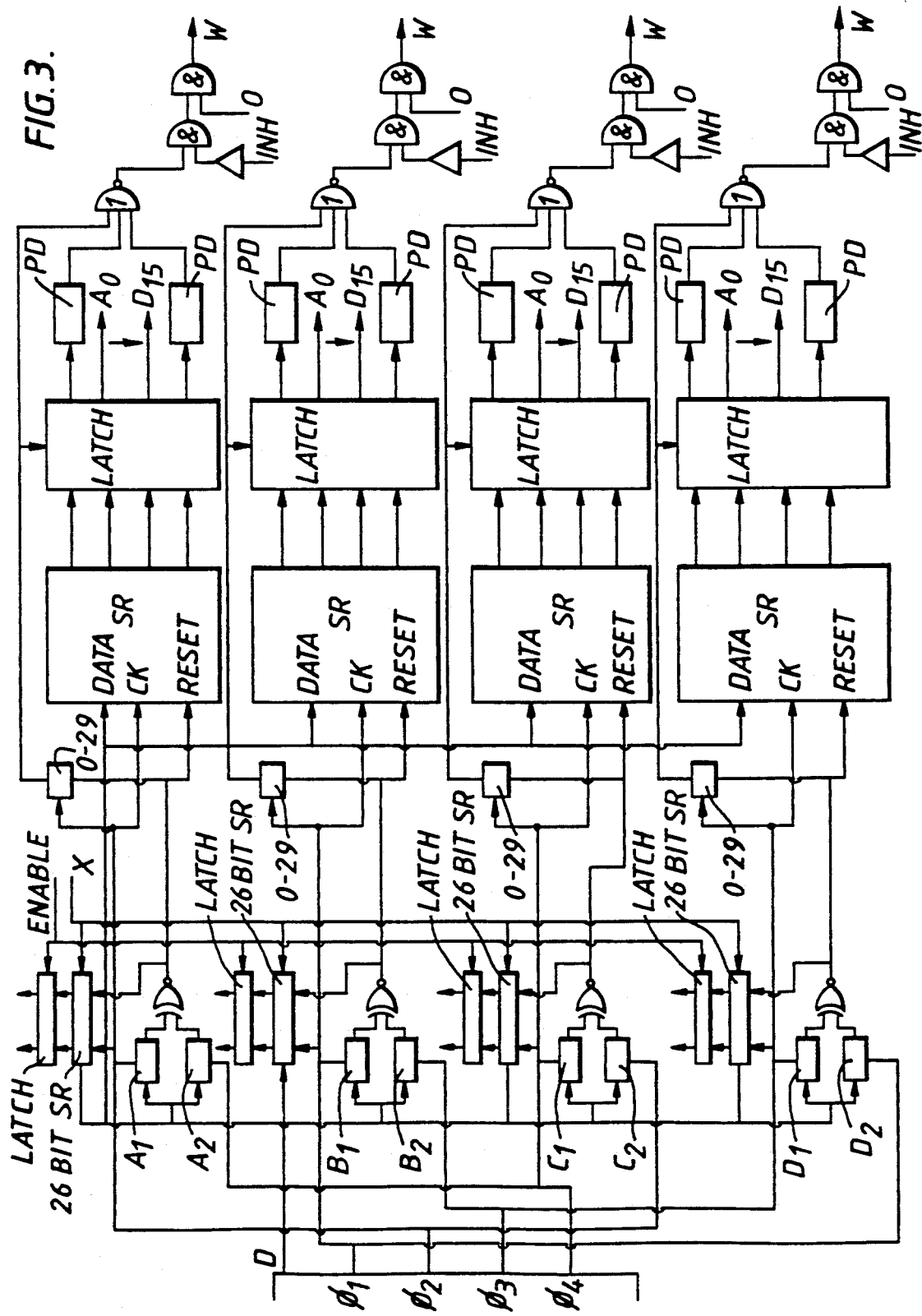
FIG. 3 shows a receiver format.

Once a particular synch. pattern has been detected and the appropriate system clocks enabled, the incoming data is latched into the second half of the receiver. If pattern A is detected, again clocks $\phi_2$ and $\phi_4$ are enabled. (See FIG. 3).

Clock $\phi_2$ is used to latch the following address, data and parity bits into the twenty-six bit shift register. Each negative transition of $\phi_2$ also clocks a 0–26 bit counter which, on the negative transition of the twenty-sixth pulse, latches the data bits present at the output of the shift register.

The message format comprises twenty-nine bits which are divided as:

| | |
|---|---|
| synch. pulse | 3 bits |
| address tag | 8 bits |
| address parity | 1 bit |
| data word | 16 bits |
| data parity | 1 bit |

The device is capable of transmitting a variable number of different message lengths from 0 to 256 words per message. A transmission rate of 680 kHz is maintainable.

When the rising edge of $\phi_2$ clocks data into shift register A, it also clocks the data contained in the first half of each Manchester coded bit into the master slave flip-flop $A_1$. The data from the second half of each bit is clocked through D-type latch, $A_2$, on the rising edge of $\phi_4$. The data bit contained in the master slave flip-flop, is output on the negative edge of $\phi_2$, such that both outputs occur at the same time, and an exclusive NOR gate is clocked.

If both half bits are at a constant value, when an error occurs in the Manchester coded data, the output of the exclusive NOR gate is used to reset the twenty-six bit shift register A. The 0-26 bit counter is also reset by an error in the data. This ensures that data is not transmitted through to the internal DPM of the chip if that data contains an error. This check is performed on the address, data and parity bits.

If an error does occur in the data such that a cross-over of clock signals occurs at the next synch. pulse, care has to be taken to ensure that an erroneous bit is not clocked. For example, if $\phi_1$ and $\phi_3$ are enabled and an error occurs such that the clocks and data have a relationship as shown by pattern A, then as $\phi_1$ and $\phi_3$ are continuously clocked through the next synch. pulse until clock pulse eleven, and the last bit of the synch. will be clocked into shift register B. This erroneous bit however, is not transmitted since shift register B is disabled, whilst shift register A is enabled. A transfer between pattern A and B is the only case when the last synch. bit is clocked. Transfer between A and any other synch. pattern will always result in the synch. pulse not being clocked into the shift register. If an error now occurs such that pattern B transfers back to A at the next synch. pulse then shift register A will be reset by $\phi_1$ and $\phi_3$ thus clearing the previous erroneous bit.

By referring to FIG. 1, the maximum permissible switching time that can be tolerated between a particular synch. pattern being detected, and the switching of its associated clock signals is 12.5 ns. Using 3 $\mu$m CMOS technology the overall switching speed may be reduced to 4 ns, thus rendering any lengthening of the synch. pulse unprofitable.

When all twenty-six error-free bits have been clocked into any one shift register, they are latched by its associated tri-state latch onto a common bus, twenty-four bits wide. The last two bits 23 and 24, (the address and data parity bits respectively) are fed into parity detectors, in order to perform a further validation check on the incoming data. If parity detection is successful, and the inhibit pulse from the processor interface is 'low' then a 'write' signal is transmitted to the DPM buffer via a four-input OR gate (see FIG. 3). This will occur on the negative transition of the twenty sixth bit output from the 0-26 bit counter.

As AMPS architecture comprises a modular computer card or GCM, each card includes eight communications chips, which operate to receive and concentrate data, process it, voting where necessary, and to issue, via a transmitter chip, instructions to actuators to operate control surfaces. Of the eight chips, seven are configured as receivers (Rx) and one as a transmitter (Tx).

Figure 4:
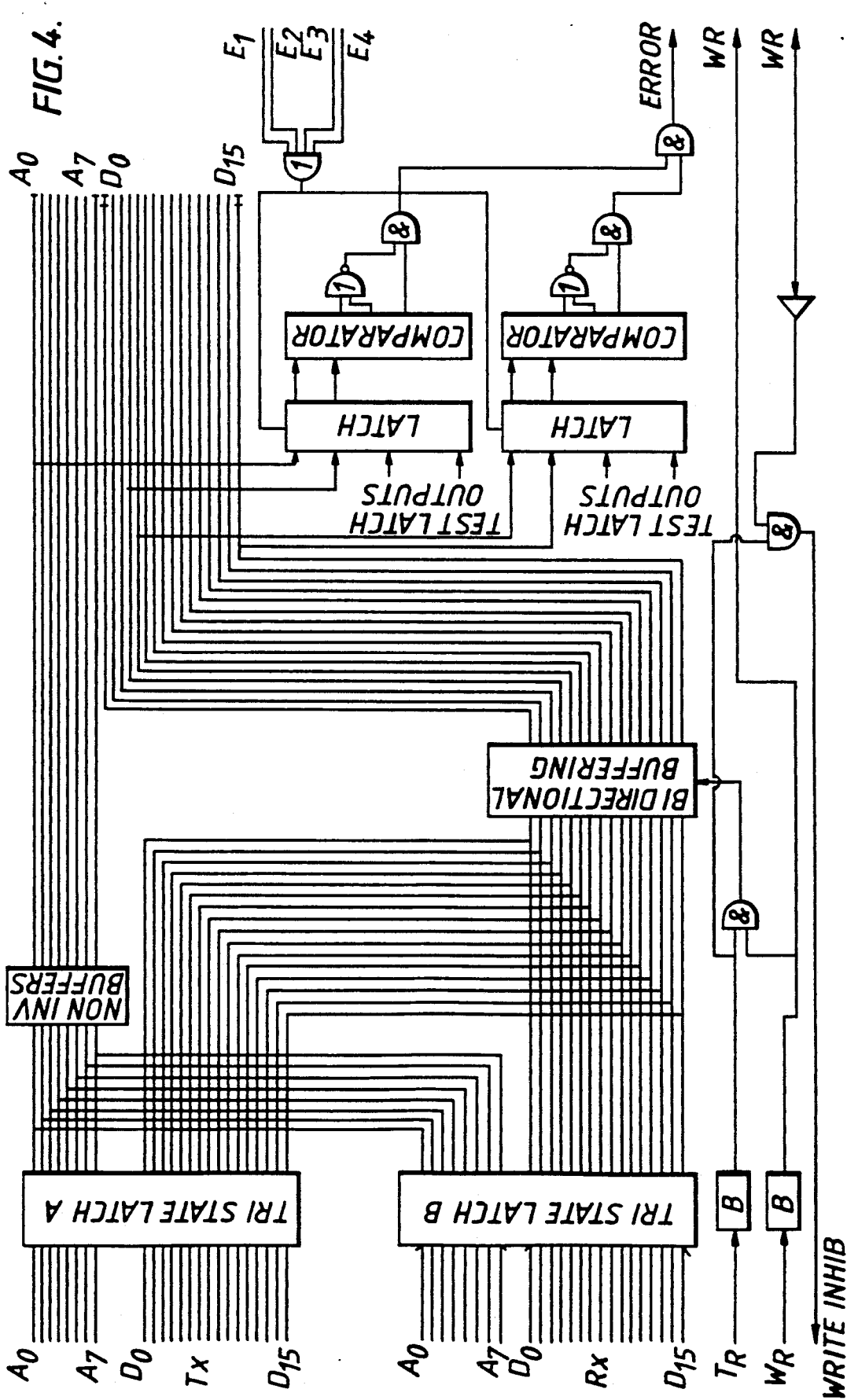
FIG. 4 shows tri-state latch circuitry fed from the latches of the receiver format of FIG. 3.
Figure 5:
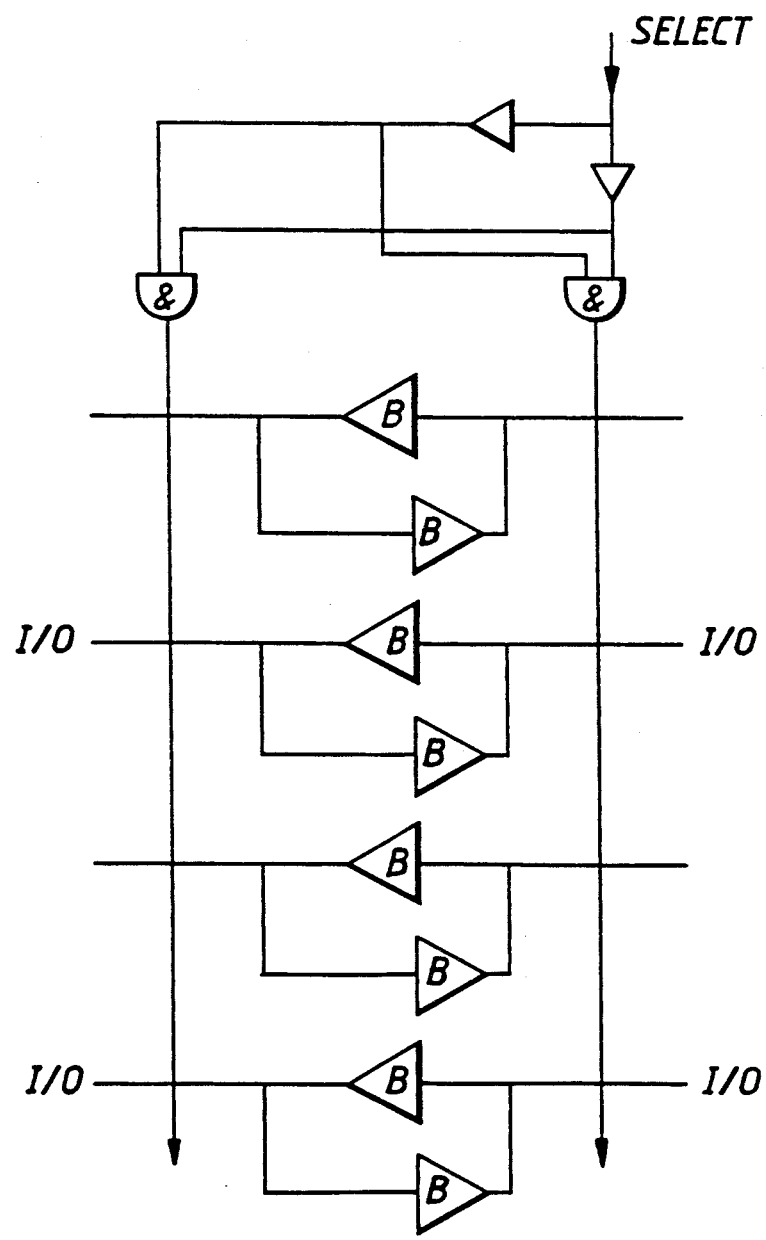
FIG. 5 shows a bi-directional buffer.

When the communications chip is configured as a receiver (Rx), tri-state latch B is enabled and tri-state latch A disabled (see FIG. 4). The eight address bits $A_0$ to $A_7$ associated with each data word are latched through to the DPM via uni-directional non-inverting buffers. These address bits are used to write each data word into a specific location in memory. When the 'write' signal from the receiver goes 'high' then the data bits $D_0$ to $D_{15}$ are latched through a bi-directional buffer (see FIG. 5) to the DPM.

When configured as a transmitter, latch A is enabled and latch B disabled. The address bits are again latched through non-inverting buffers to the DPM, whilst the bi-directional buffers are configured via the 'Tx' and 'read' signal to accept data being read from the DPM.

Priorities are be resolved thus:

a) When the chip is configured as a receiver (Rx), the microprocessor 'read' will always have priority over the receiver 'write' command; for instance, when 'read' goes 'low' then the receiver 'write' signal is disabled.

b) When the chip is configured as a transmitter (Tx), the transmitter 'read' will always have priority over the microprocessor 'write' command.

When the chip is configured as a transmitter, sixteen bit data is retrieved from DPM encoded into a Manchester format and transmitted in frame lengths of up to 256 words. Each word will consist of a three bit synch. pulse used by the receiver to synchronise data with the system clock, an eight bit address tab, sixteen bit data word and one bit address and data parity.

Figure 6:
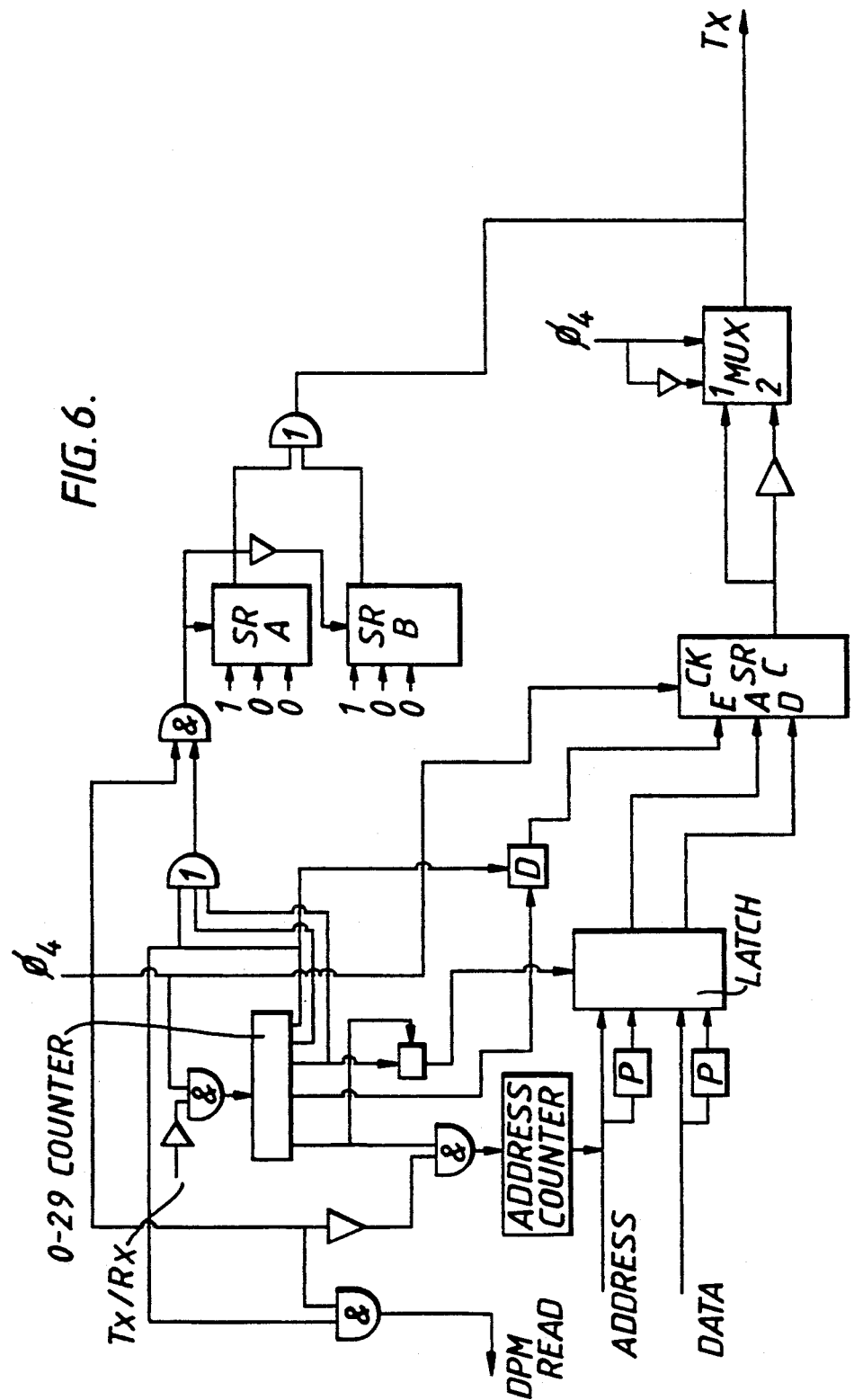
FIG. 6 shows transmitter encoding circuitry.
Figure 7:
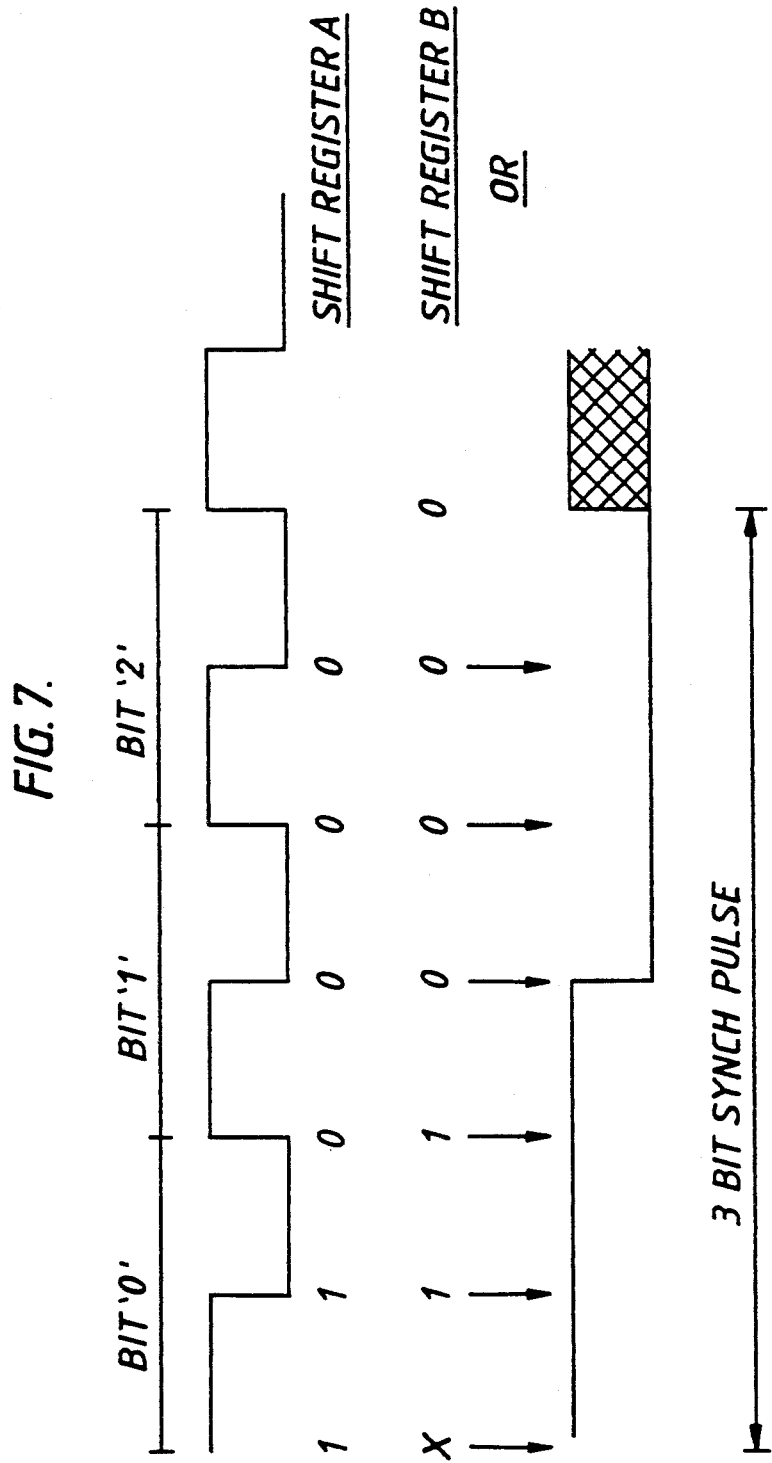
FIG. 7 shows outputs from shift registers A and B.

The transmitter encoding circuitry is outlined in FIG. 6. The 0-29 bit counter is clocked by a 20 MHz system clock (i.e. $\phi_2$) after being enabled via the Rx/Tx pin. When output '0' goes 'high' shift registers A and B are enabled and are clocked by $\phi_2$ and $\overline{\phi_2}$ respectively. Both outputs (which are shown in FIG. 7) are combined by an OR gate to produce the three bit synch. pulse output and both shift registers are disabled on the rising edge of output '3' from the 0-29 bit counter.

The address counter shown is incremented on the negative transition of bit 29, and is used to address the 4k bit DPM. The DPM 'read' line is enabled on the positive edge of output '0', after which the address and data bits are passed through parity generators to a twenty-six bit wide latch. The address and data bits are latched on the positive transition of output '2' from the 0-29 bit counter, via a D-type flip-flop.

On the positive edge of output '3', shift register C is enabled which allows the parallel address and data bits to be clocked out in a serial format by $\phi_2$. Shift register C is disabled on the positive edge of output '0', therefore ensuring that data is only output at the end of the three bit synch. pulse.

The information output from shift register C is encoded into a Manchester format via the two-input multiplexer shown. The positive transition of $\phi_2$, transmits the data in the first half of each bit, whilst the negative transition clocks through the complement of this data, to form a Manchester protocol.

The device has a built-in test facility for both transmit and receive modes. For the receive mode, every sixteenth word in a 256 word frame is clocked into a twenty-six bit test shift register at the beginning of the receive circuitry. This same word is then clocked through to the output of the DPM buffer, to a twenty-four bit comparator. The original word stored in the test shift register is then compared with the latter, and if they differ an error is deemed to have occurred in that position of the chip circuitry and an error flag set 'high'.

Figure 8:
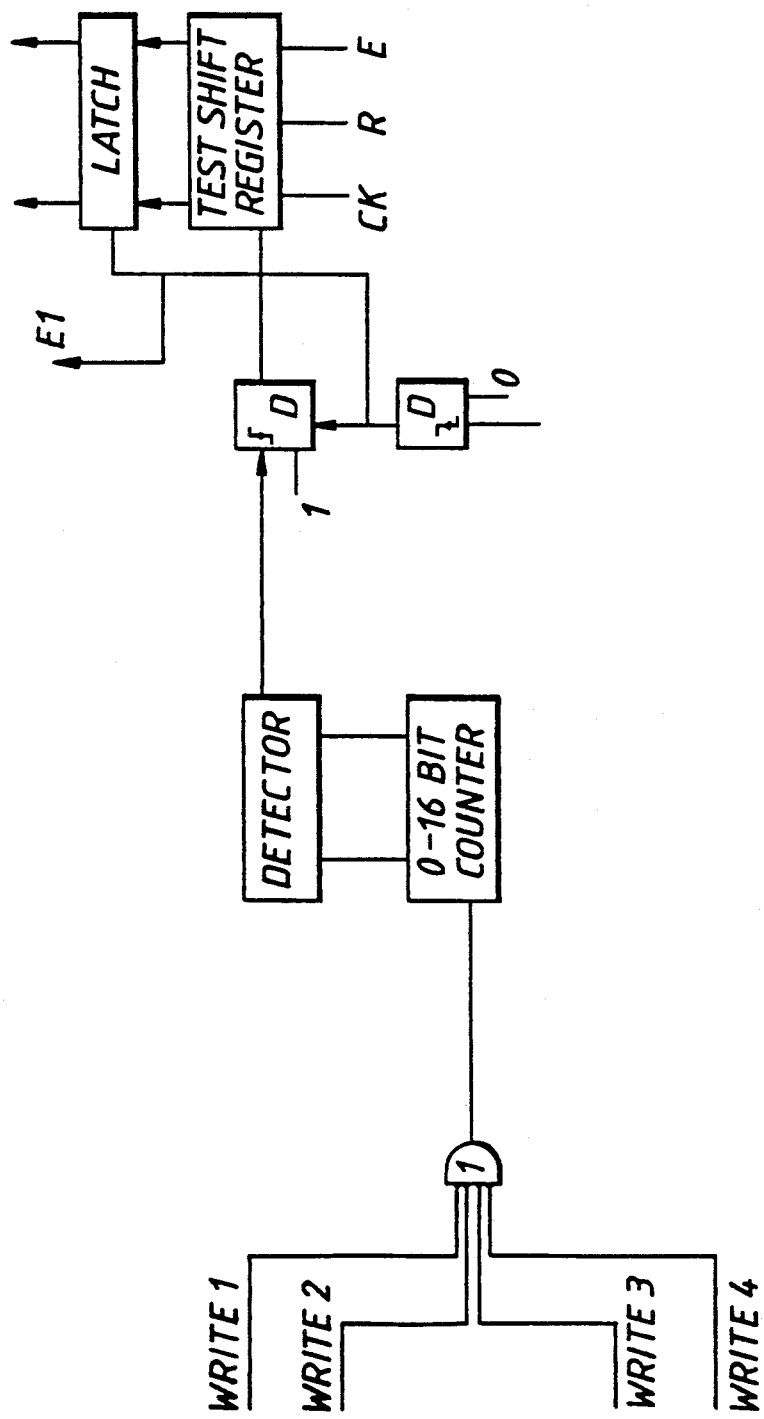
FIG. 8 shows a circuit implementing a built-in test facility.

To detect every sixteenth data word the four 'write' signals from the receiver, are used to clock a 0-16 counter via an OR gate. When the counter output equals sixteen all four twenty-six bit test shift registers are enabled (see FIG. 8). Data is then latched into the shift register enabled via the system clock, with the synch. pulse being detected and reset. When output '26' from the 0-26 bit counter goes 'low' then the test shift register is disabled and the output latched through to the comparator.

The same test philosophy is adopted for the transmit circuitry with test words being clocked into a twenty-six bit latch at the beginning of the circuit. The same word is then clocked into a shift register at the output and compared with the original latched bits to identify any faults occuring in the transmit circuitry.

Both receive and transmit built in test are therefore in continous operation. The processor interface and DPM access circuitry can be tested by external built-in test circuitry on power-up. A failure in that part of the device would therefore be flagged, before any 'on-chip' built-in test takes place.

Figure 9:
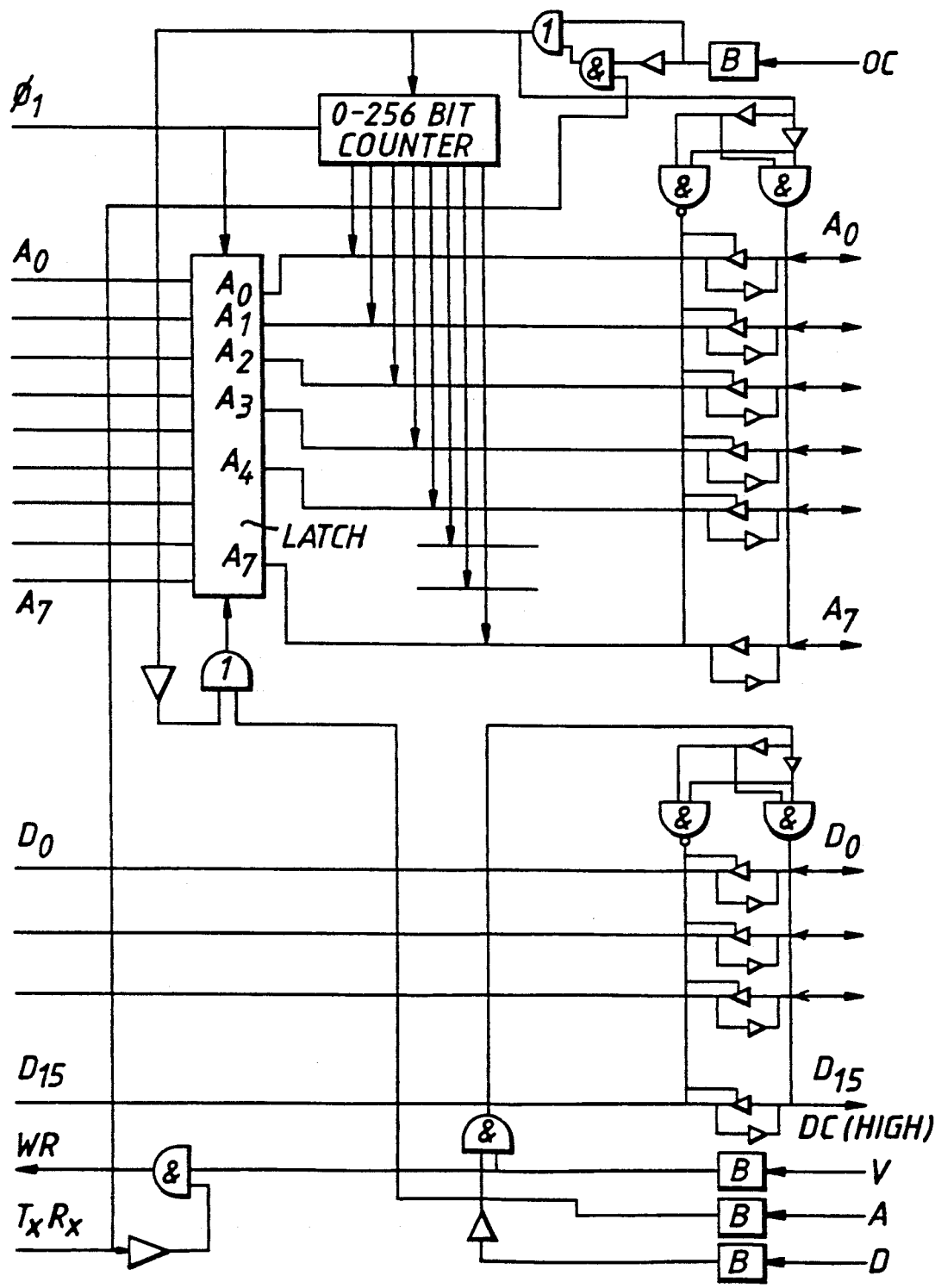
FIG. 9 shows a processor interface.

The general purpose processor interface shown in FIG. 9 will enable a number of microprocessors to interface directly to the DPM whether in transmit or receive mode. It also contains the circuitry required to configure the chip as a data concentrator.

When in receive mode the address and data bi-directional buffers are enabled such that the address lines are. configured from the processor, and the data lines to the processor. The 0-256 bit address counter is disabled and the address latch enabled.

When in transmit mode both address and data buffers are configured to receive information from the processor. The data concentrator circuitry is enabled by setting both the 'DC' and W/R pins 'high'. This enables the internal counter to output 0-256 address bytes to an external remapping PROM. A number of external receive chips may then be accessed, and their stored information read back to the internal DPM of the data concentrator. The information received is then transmitted in a serial format from the transmit circuitry of the chip.

I claim:

1. An asynchronous communications device including a dual port memory, means for inputting data into the dual port memory, means for outputting data from the dual port memory, clock means, having a clock frequency of 80 MHz used for the operation of the device, wherein a 40 MHz clock signal is used to derive the 80 MHz clock frequency, the 80 MHz frequency being formed by four 20 MHz clock frequencies arranged with their rising edges 90° out of phase, the device being configured to operate in a receive mode in which it receives information, or a transmit mode, in which it transmits information, according to its connection in a communications system.

2. A device according to claim 1, including a built-in test facility for both the transmit mode and the receive mode.

* * * * *